United States Patent
Cho et al.

(10) Patent No.: US 10,586,150 B2
(45) Date of Patent: Mar. 10, 2020

(54) SYSTEM AND METHOD FOR DECODING SPIKING RESERVOIRS WITH CONTINUOUS SYNAPTIC PLASTICITY

(71) Applicant: HRL Laboratories, LLC, Malibu, CA (US)

(72) Inventors: Youngkwan Cho, Los Angeles, CA (US); Narayan Srinivasa, Oak Park, CA (US)

(73) Assignee: HTL Laboratories, LLC, Malibu, CA (US)

(*) Notice: Subject to any disclaimer, the term of this patent is extended or adjusted under 35 U.S.C. 154(b) by 602 days.

(21) Appl. No.: 15/075,063

(22) Filed: Mar. 18, 2016

(65) Prior Publication Data

US 2017/0316310 A1    Nov. 2, 2017

Related U.S. Application Data

(60) Provisional application No. 62/134,957, filed on Mar. 18, 2015.

(51) Int. Cl.
*G06N 3/08* (2006.01)
*G06K 9/00* (2006.01)
(Continued)

(52) U.S. Cl.
CPC .......... *G06N 3/08* (2013.01); *G06K 9/00543* (2013.01); *G06K 9/00805* (2013.01);
(Continued)

(58) Field of Classification Search
CPC .......... G06N 3/08; G06N 3/049; G06N 3/02; G06N 3/0445; G06N 3/088;
(Continued)

(56) References Cited

U.S. PATENT DOCUMENTS 8,756,183 B1    6/2014  Daily et al.
8,818,923 B1    8/2014  Hoffmann
(Continued)

OTHER PUBLICATIONS

Mitra et al., "Real-Time Classification of Complex Patterns Using Spike-Based Learning in Neuromorphic VLSI", Feb. 2009, IEEE Transactions on Biomedical Circuits and Systems, vol. 3, No. 1, pp. 32-42 (Year: 2009).*

(Continued)

*Primary Examiner* — Hal Schnee
*Assistant Examiner* — Brent Johnston Hoover
(74) *Attorney, Agent, or Firm* — Tope-McKay & Associates

(57) ABSTRACT

Described is a system for decoding spiking reservoirs even when the spiking reservoir has continuous synaptic plasticity. The system uses a set of training patterns to train a neural network having a spiking reservoir comprised of spiking neurons. A test pattern duration d is estimated for a set of test patterns P, and each test pattern is presented to the spiking reservoir for a duration of d/P seconds. Output spikes from the spiking reservoir are generated via readout neurons. The output spikes are measured and the measurements are used to compute firing rate codes, each firing rate code corresponding to a test pattern in the set of test patterns P. The firing rate codes are used to decode performance of the neural network by computing a discriminability index (DI) to discriminate between test patterns in the set of test patterns P.

14 Claims, 11 Drawing Sheets

(51) Int. Cl.
G06K 9/66 (2006.01)
G06K 9/46 (2006.01)
G06N 3/04 (2006.01)
G01S 7/41 (2006.01)

(52) U.S. Cl.
CPC ............. *G06K 9/4623* (2013.01); *G06K 9/66* (2013.01); *G06N 3/049* (2013.01); *G06N 3/0445* (2013.01); *G06N 3/088* (2013.01); *G01S 7/414* (2013.01); *G01S 7/417* (2013.01)

(58) Field of Classification Search
CPC ........... G06K 9/00543; G06K 9/00805; G06K 9/4623; G06K 9/66; G01S 7/414; G01S 7/417
See application file for complete search history.

(56) References Cited

U.S. PATENT DOCUMENTS

| | | | |
|---|---|---|---|
| 2009/0297043 A1 | 12/2009 | Hinton et al. | |
| 2013/0204820 A1* | 8/2013 | Hunzinger | G06N 3/049 706/25 |
| 2015/0046382 A1 | 2/2015 | Rangan | |
| 2015/0203023 A1* | 7/2015 | Marti | B60Q 1/00 340/425.5 |

OTHER PUBLICATIONS

Lukosevicius et al., "Reservoir computing approaches to recurrent neural network training", Aug. 2009, Computer Science Review, vol. 3, Issue 3, pp. 127-149 (Year: 2009).*
Tkacik et al., "Optimal population coding by noisy spiking neurons", Jul. 26, 2010, National Academy of Sciences, pp. 1-6 (Year: 2010).*
Luczak et al.,"Sequential structure of neocortical spontaneous activity in vivo", Dec. 21, 2006, National Academy of Sciences, pp. 347-352 (Year: 2006).*
Srinivasa et al., "Stable learning of functional maps in self-organizing spiking neural networks with continuous synaptic plasticity", Feb. 27, 2013, Frontiers in Computational Neuroscience, pp. 1-24 (Year: 2013).*
Lukosevicius et al., "Reservoir Computing and Self-Organized Neural Hierarchies", 2012, Jacobs University PhD Thesis, pp. 1-136 (Year: 2012).*
Schleibs et al., "Reservoir-based evolving spiking neural network for spatio-temporal pattern recognition", 2011, International Conference on Neural Information Processing ICONIP 2011: Neural Information Processing, pp. 1-9 (Year: 2011).*
Roy et al., "Liquid State Machine with Dendritically Enhanced Readout for Low-power, Neuromorphic VLSI Implementations", Nov. 20, 2014, IEEE Transactions on Biomedical Circuits and Systems, vol. 8, Issue 5, pp. 681-695 (Year: 2014).*

Krizhevsky, A., Sutskever, I., & Hinton, G. E. (2012). ImageNet classification with deep convolutional neural networks. In Advances in neural information processing systems, pp. 1097-1105.
Hinton, G. E., Salakhutdinov, R. R. (2006). Reducing the Dimensionality of Data with Neural Networks. Science, 313, 5786: pp. 504-507.
Maass, W., Natscchlager, T., & Markram, H. (2002). Real-time computing without stable states: A new framework for neural computation based on perturbation, Neural Computation, 14, 11: pp. 2531-2560.
Jaeger, H. and Haas, H. (2004). Harnessing nonlinearity: predicting chaotic systems and saving energy in wireless communications. Science, 304: pp. 78-90.
Langton, C. G. (1990). Computation at the edge of chaos, Physica D, 42: pp. 12-37.
Srinivasa, N. and Cho, Y. K. (2014). Unsupervised Discrimination of Patterns in Spiking Neural Networks with Excitatory and Inhibitory Synaptic Plasticity. Frontiers in Computational Neuroscience, 8, 159: pp. 1-23.
Churchland, M. M,, Yu B. M., Cunningham, J. P., Sugrue, L. P., Cohen M. R., et al. (2010). Stimulus onset quenches neural variability: a widespread cortical phenomenon. Nature Neuroscience, 13, pp. 369-378.
Eden, U. T. and Kramer, M. A. (2010). Drawing inferences from Fano factor calculations, Journal of Neuroscience Methods, 190, pp. 149-152.
Ratnam, R. and Nelson, M. E. (2000). Nonrenewal Statistics of Electrosensory Afferent Spike Trains: Implications for the Detection of Weak Sensory Signals. Journal of Neuroscience, 20, pp. 6672-6683.
Chacron, M. J., Longtin, A., and Maler L. (2001). Negative interspike interval correlations increase the neuronal capacity for encoding time-varying stimuli. Journal of Neuroscience, 21, pp. 5328-5343.
International Preliminary Report on Patentability for PCT/US2016/023313; dated Jul. 17, 2017.
McLachlan, G. J. (2004). Discriminant Analysis and Statistical Pattern Recognition. Wiley Interscience. Fisher's linear Regression Approach, pp. 63-64.
Kanerva, P. (1988). Sparse Distributed Memory. MIT Press Cambridge, MA. Chapter 1, pp. 15-27.
International Search Report of the International Searching Authority for PCT/US2016/023313; dated Jul. 12, 2016.
The Written Opinion of the International Searching Authority for PCT/US2016/023313; dated Jul. 12, 2016.
Notification of Transmittal of International Search Report and the Written Opinion of the International Searching Authority for PCT/US2016/023313; dated Jul. 12. 2016.
Narayan Srinivasa et al., "Unsupervised discrimination of patterns in spiking neural networks with excitatory and inhibitory synaptic plasticity," In: frontiers in Computational Neuroscience, Dec. 15, 2014, vol. 8, pp. 2-21.

* cited by examiner

SYSTEM AND METHOD FOR DECODING SPIKING RESERVOIRS WITH CONTINUOUS SYNAPTIC PLASTICITY

CROSS-REFERENCE TO RELATED APPLICATIONS

This is a Non-Provisional Patent Application of U.S. Provisional Application No. 62/434,957, filed in the United States on Mar. 18, 2015, entitled, "A Method for Decoding Spiking Reservoir with Continuous Synaptic Plasticity," the entirety of which is incorporated herein by reference.

BACKGROUND OF INVENTION

(1) Field of Invention

The present invention relates to a system for decoding spiking reservoirs composed of spiking neurons and, more particularly, to a system for decoding spiking reservoirs even when the spiking reservoir has continuous synaptic plasticity.

(2) Description of Related Art

Most computational models inspired by the brain focus on computations in feedforward circuits (as described in Literature Reference Nos. 1 and 2 of the List of Incorporated Literature References), likely because computations in feedforward circuits are much easier to analyze. However, circuits in the brain are known to be recurrent with the existence of feedback connections on several spatial scales (see Literature Reference No. 5).

Recently, a new idea was adopted that the rich dynamics of neural systems can be observed in brain circuits rather than be restricted to having certain characteristics, such as a purely feedforward architecture. These efforts resulted in the liquid state machines (described in Literature Reference No. 3) and the echo state network (described in Literature Reference No. 4). However, these may only be applicable for firing rate models.

Thus, a continuing need exists for a system that can discriminate among spiking output neurons from spiking reservoir networks with continuous plasticity and may allow for unsupervised discrimination among test patterns.

SUMMARY OF INVENTION

The present invention relates to a system for decoding spiking reservoirs composed of spiking neurons and, more particularly, to a system for decoding spiking reservoirs even when the spiking reservoir has continuous synaptic plasticity. The system comprises one or more processors and a memory having instructions such that when the instructions are executed, the one or more processors perform multiple operations. The system uses a set of training patterns to train a neural network having a spiking reservoir comprised of spiking neurons. A test pattern duration d is estimated for a set of test patterns P. Each test pattern is presented to the spiking reservoir for a duration of d/P. Output spikes from the spiking reservoir are generated via a set of readout neurons. The output spikes are measured, resulting in a plurality of measurements, and the plurality of measurements are used to compute firing rate codes, each firing rate code corresponding to a test pattern in the set of test patterns P. The firing rate codes are used to decode performance of the neural network by computing a discriminability index (DI) to discriminate between test patterns in the set of test patterns P.

In another aspect, the neural network exhibits continuous plasticity.

In another aspect, the system perform operations of:
computing, for each test pattern p, firing rates $f_i^p$ of a sink neuron i in the neural network as the total number of output spikes during a duration d;
estimating a maximum firing rate $f_{max}^p$ from the firing rates $f_i^p$ of all sink neurons in the neural network for the test pattern p; and
computing a firing rate code for each test pattern p using $f_{max}^p$ and $f_i^p$.

In another aspect, the DI is a product of a separability measure, $\varepsilon$, and a uniqueness measure, $\gamma$, wherein the separability measure is defined as a measure of a degree of separation of firing rate codes for the set of test patterns P, and wherein the uniqueness measure is defined as a number of unique firing rate codes produced by the neural network relative to a maximum possible number of unique firing rate codes.

In another aspect, the separability measure is computed according to the following:

$$\varepsilon = 1 - \frac{D_{intra}}{D_{inter}},$$

where $D_{intra}$ is defined as an average pair-wise distance between firing rate codes computed from all possible unique pairs of firing rate codes generated by the neural network for the same test pattern, and $D_{inter}$ is defined as an average pair-wise distance between firing rate codes computed from all possible unique pairs of firing rate codes generated by the neural network for the set of test patterns P.

In another aspect, the uniqueness measure is computed according to the following:

$$\gamma = \frac{\#S}{P},$$

where # S represents the total number of unique firing rate codes for the set of test patterns P.

In another aspect, the set of test patterns P are input patterns from images obtained around a vehicle, wherein the set of test patterns P are used to assist the vehicle in autonomous driving.

In another aspect, an input signal is provided to a neural network, the neural network having a spiking reservoir comprised of trained spiking neurons trained The spiking neurons were trained by presenting each test pattern in a set of test patterns to the spiking reservoir; generating output spikes from the spiking reservoir via a set of readout neurons; measuring the output spikes, resulting in a plurality of measurements, and using the plurality of measurements to compute firing rate codes, each firing rate code corresponding to a test pattern in the set of test patterns P. Performance of the neural network is determined, using the firing rate codes, by computing a discriminability index (DI) to discriminate between test patterns in the set of test patterns P. A readout code is obtained from the neural network produced in response to the input signal, and a component of the input signal is identified based on the readout code.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
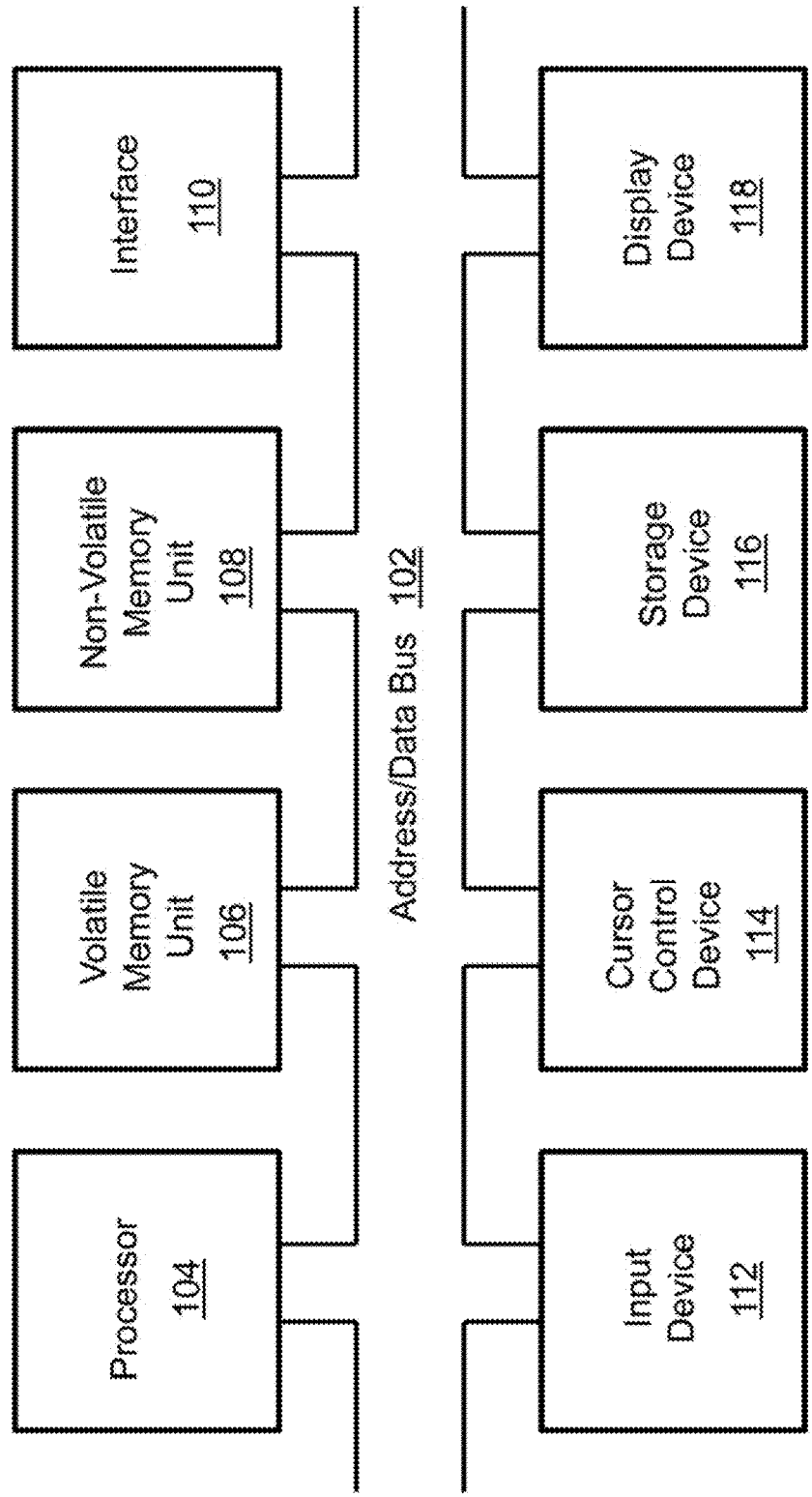
FIG. 1 is a block diagram depicting the components of a system for decoding spiking reservoirs according to some embodiments of the present disclosure.

The present invention relates to a system for decoding spiking reservoirs composed of spiking neurons and, more particularly, to a system for decoding spiking reservoirs even when the spiking reservoir has continuous synaptic plasticity. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, hut is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112 Paragraph 6.

Before describing the invention in detail, first a list of cited references is provided. Next, a description of the various principal aspects of the present invention is provided. Finally, specific details of the present invention are provided to give an understanding of the specific aspects.

(1) List of Incorporated Literature References

The following references are incorporated and cited throughout this application. For clarity and convenience, the references are listed herein as a central resource for the reader. The following references are hereby incorporated by reference as though fully set forth herein. The references are cited in the application by referring to the corresponding literature reference number.

1. Krizhevsky, A., Sutskever, I., & Hinton, G. E. (2012). ImageNet classification with deep convolutional neural networks. In Advances in neural information processing systems, 1097-1105.

2. Hinton, G. E., Salakhutdinov, R. R. (2006). Reducing the Dimensionality of Data with Neural Networks. Science, 313, 5786: 504-507.

3. Maass, W., Natscchlager, T., & Markram, H. (2002). Real-time computing without stable states: A new framework for neural computation based on perturbation, Neural Computation, 14, 11: 2531-2560.

4. Jaeger, H. and Haas, H. (2004), Harnessing nonlinearity: predicting chaotic systems and saving energy in wireless communications. Science, 304: 78-90.

5. Langton, C. G. (1990). Computation at the edge of chaos, Physica D, 42:12-37.

6. Srinivasa, N. and Cho, Y. K. (2014). Unsupervised Discrimination of Patterns in Spiking Neural Networks with Excitatory and Inhibitory Synaptic Plasticity. Frontiers in Computational Neuroscience, 8, 159: 1-23.

7. Churchland, M. M., Yu B. M., Cunningham, J. P., Sugrue, L. P., Cohen M. R., et al. (2010). Stimulus onset quenches neural variability: a widespread cortical phenomenon. Nature Neuroscience, 13, 369-78.

8. Eden, U. T. and Kramer, M. A. (2010). Drawing inferences from Fano factor calculations, Journal of Neuroscience Methods, 190, 149-152.

9. Ratnam, R. and Nelson, M. E. (2000). Nonrenewal Statistics of Electrosensory Afferent Spike Trains: Implications for the Detection of Weak Sensory Signals. Journal of Neuroscience, 20, 6672-6683.

10. Chacron, M. J., Longtin, A., and Maler L. (2001). Negative interspike interval correlations increase the neuronal capacity for encoding time-varying stimuli. Journal of Neuroscience, 21, 5328-5343.

11. McLachlan, G. J. (2004). Discriminant Analysis and Statistical Pattern Recognition. Wiley Interscience.

12. Kanerva, P. (1988). Sparse Distributed Memory. MIT Press Cambridge, Mass.

(2) Principal Aspects

The present invention has three "principal" aspects. The first is a system for decoding spiking reservoirs. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adapters, etc.) and/or wireless (e.g., wireless modems, wireless network adapters, etc) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. For example, the input device 112 may include one or more sensors, such as a camera for video or still images, a microphone, or a neural sensor. Other example input devices 112 may include an accelerometer, a GPS sensor, or a gyroscope.

In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
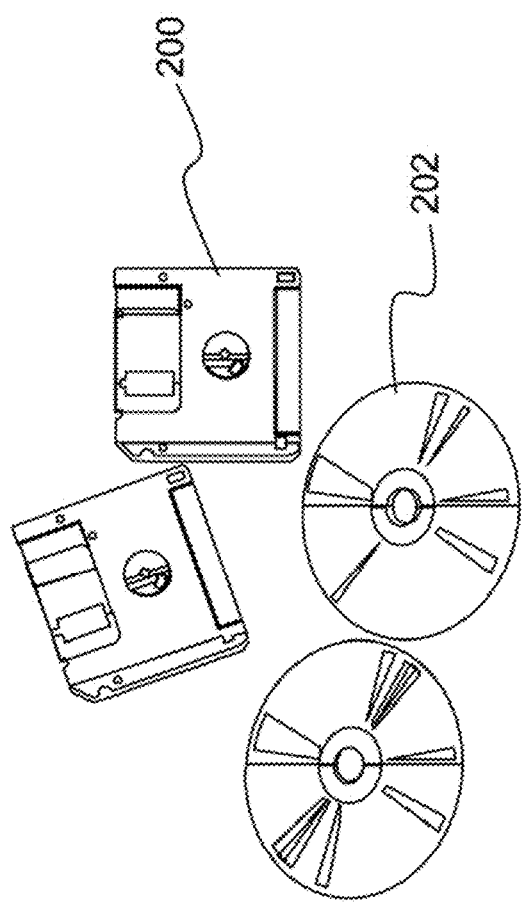
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Described is a system and method to decode reservoirs composed of spiking neutrons with spike timing dependent plasticity. The system, in implementing the method, enables unsupervised decoding from continuous outputs using a distributed code. Unlike the winner-take-all linear readout based decoders commonly used, the present invention includes an information theory inspired distributed readout code that enables unsupervised learning from a reservoir even when the reservoir has continuous synaptic plasticity. In the present invention, the reservoirs contain scrambled information (i.e., information that humans cannot understand). The decoder according to embodiments of the present disclosure converts the scrambled information to a human understandable form. The distributed code also makes the method according to some embodiments of the present disclosure more scalable compared to other decoders, while its unsupervised nature allows for autonomous discrimination without the need for humans in the loop.

Some embodiments of the present invention resolve one or more of two deficiencies from previous methods. The first is that the decoder according to some embodiments of the present disclosure can discriminate among spiking output neurons from spiking reservoir networks with continuous plasticity in it. Additionally, the decoder may allows unsupervised discrimination among test patterns, thus expanding the scope of possible real-world autonomous applications in situations where there is no access to humans for labeling the data.

Figure 3:
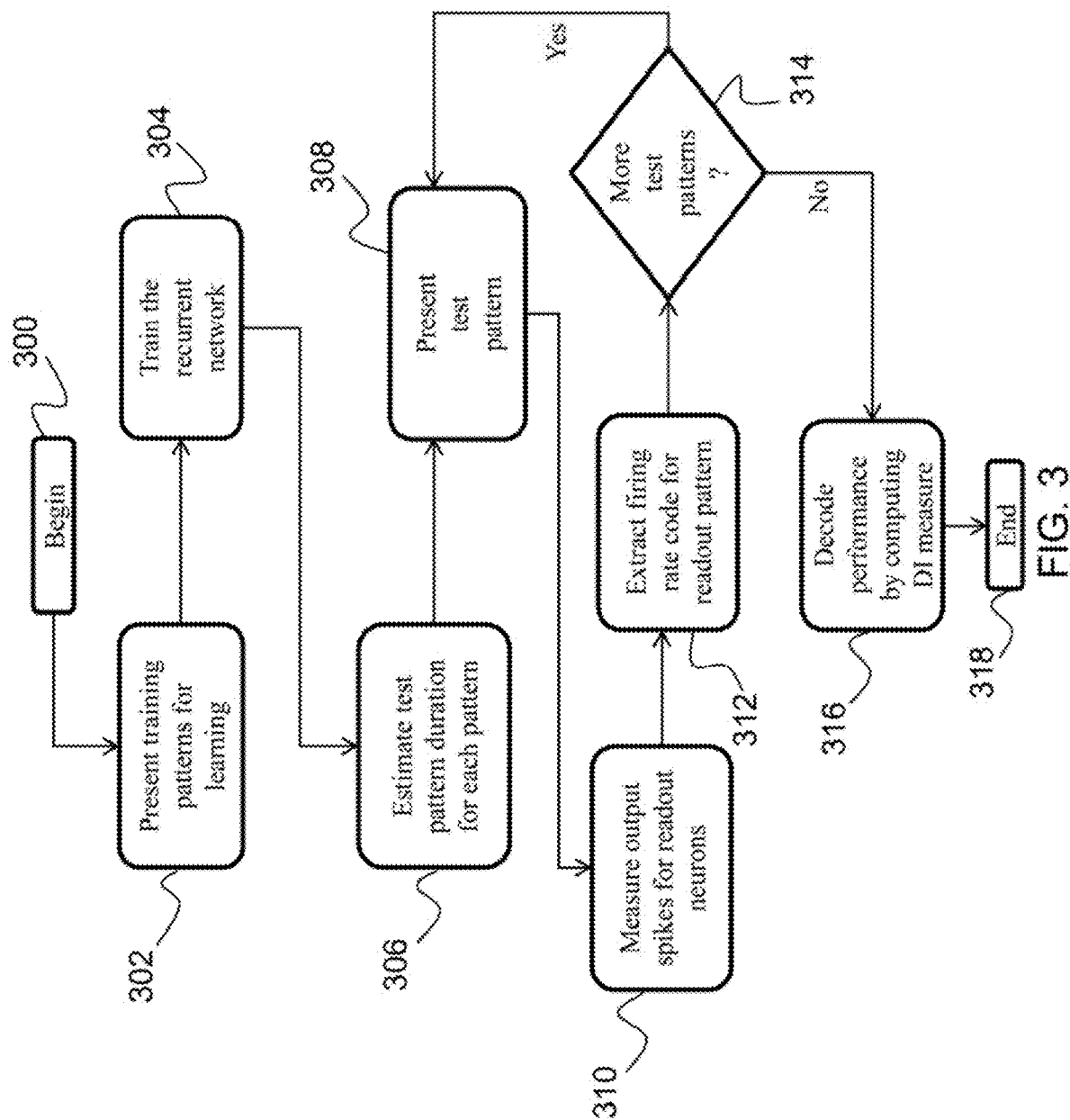
FIG. 3 is a flow chart illustrating a process for decoding spiking reservoirs according to some embodiments of the present disclosure.

The operation of basic network architecture of the present recurrent network is shown in FIG. 3, which depicts the decoding process according to some embodiments of the present disclosure. The synaptic connection between the neurons in the network of the reservoir obeys spike-timing dependent plasticity (STDP). STDP modifies the network connections based on the timing of the pre-synaptic and post-synaptic spikes during training data presentation (see Literature Reference No. 6).

As shown in FIG. 3, the process begins 300 for testing a recurrent neural network using a given test set with P test patterns. In a first operation 302, training patterns are presented for training purposes. Using the training patterns, the recurrent network is trained in a second operation 304. In a third operation 306, the test pattern duration d is estimated for a given test set using a process described in further detail below. In a fourth operation 308, each test input from the test set is presented to the reservoir after encoding it first in the form of a continuous spike train. Each pattern is fed, one at a time, to the reservoir for a total duration of d seconds such that each test pattern is presented for a duration of d/P seconds. The resulting output spikes are generated from the reservoir via readout neurons. In a fifth operation 310, output spikes for readout neurons are measured. The spikes from these readout neurons are converted into a novel firing rate code, such that firing rate codes for the readout patterns are extracted in a sixth operation 312, as described in further detail below. In a seventh operation 314, a determination is made whether there are any more test patterns. If yes, then any additional patterns are presented to the reservoir (fourth operation 308). If no, then, in an eighth operation 316, the firing rate codes from all the test patterns are used to decode network performance using a novel discriminability index that provides a measure of the how discriminable the input test patterns are from each other, even though the network exhibits continuous plasticity.

(3.1) Input Image Coding and Noise Injection

Figure 4A:
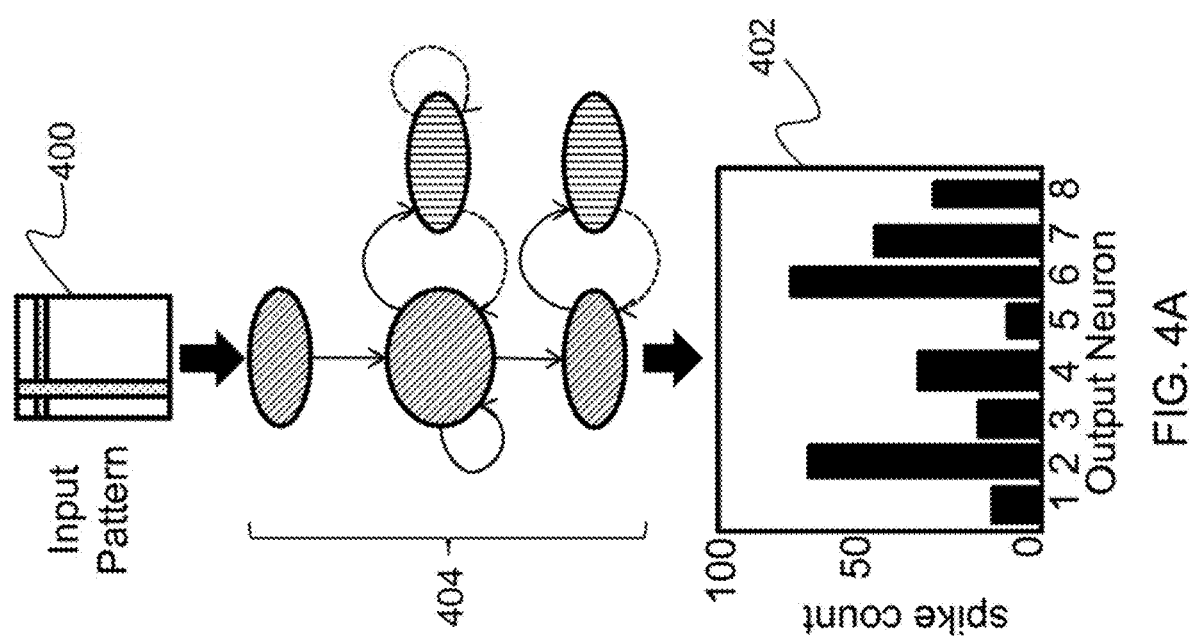
FIG. 4A is an illustration of an example input and the corresponding firing rate distribution according to some embodiments of the present disclosure.
Figure 4B:
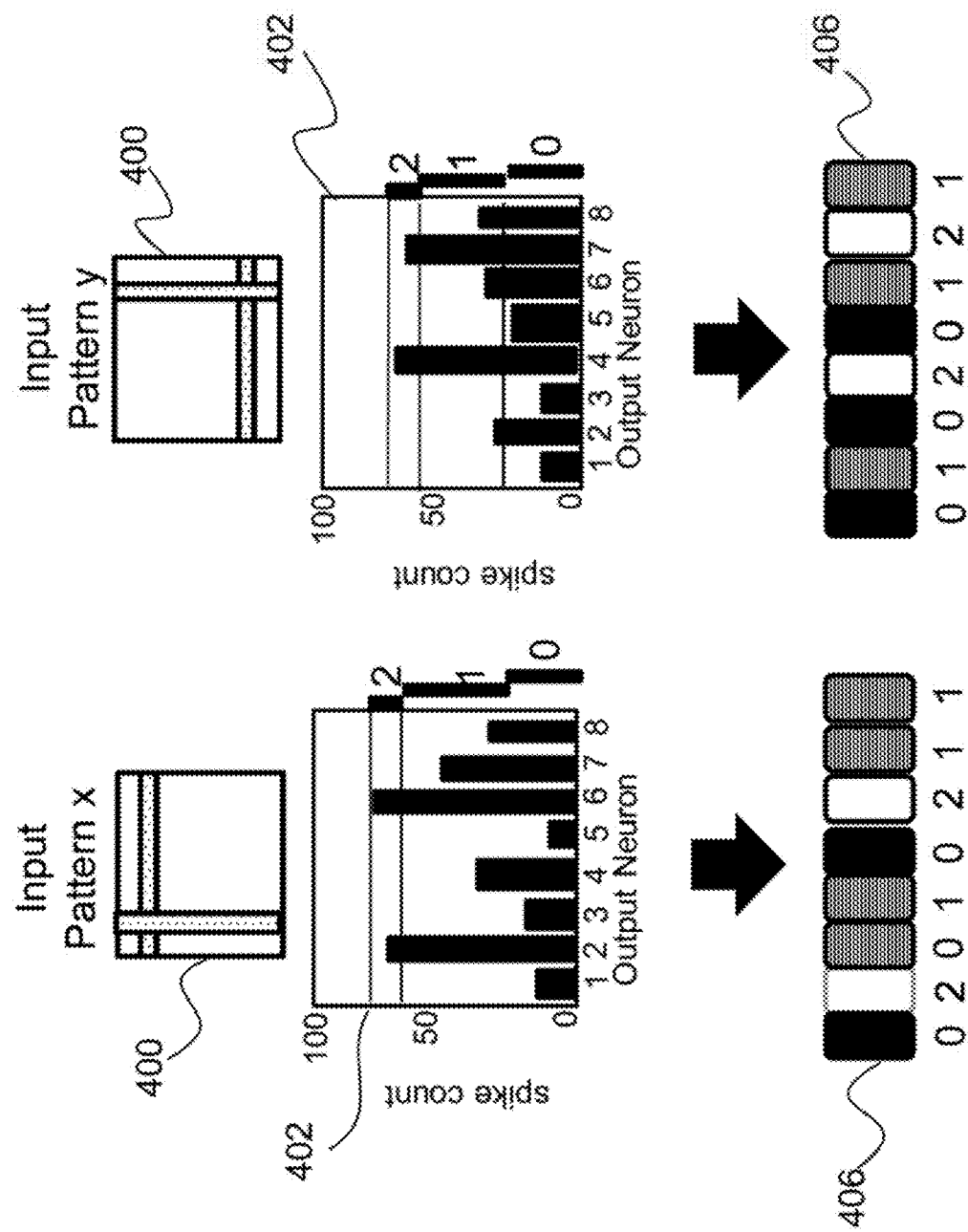
FIG. 4B is an illustration of the firing rate code for two different input patterns according to some embodiments of the present disclosure.

FIG. 4A depicts an example input and the corresponding firing rate distribution, and FIG. 4B illustrates the firing rate code for two different input patterns. As shown, each input pattern 400, in the form of a one-dimensional (1-D) vector, is converted into spike counts 402 (or sequences) by an encoding process as follows. Neurons in an input layer of a network 404 are modeled using a Poisson process, and each neuron receives an input from one component of the vector such that the maximum value of the test input component is assigned a mean firing rate of f=90 Hertz (Hz). The remaining inputs are linearly scaled in proportion to the maximum firing rate. Specifically, the top ellipse of the network 404 is the input layer, the middle ellipses represent the reservoir layer, and the bottom ellipses represent the output layer. The left bottom ellipse represents the readout decoder.

The spike encoding process is generated based on Poisson statistics. Assuming a sampling rate of dt and a mean firing rate of f Hz for a given input vector component, f spikes are generated every 1/dt samples. Thus, the probability of spiking at each time step for a given input vector component firing at f Hz is f*dt. Spike trains (i.e., a sequence of spikes) are generated for each input vector component based on its probability of spiking at each source layer neuron. In an embodiment of this disclosure, for all simulations, dt=1 ms.

(3.2) Input Pattern Presentation During Training and Testing

The training process consists of presenting each input pattern in the training set (element 302) in a random order for a duration drawn from an exponential distribution with a mean. In an embodiment of this disclosure, the mean is chosen to be 30 milliseconds (ms). The network 404 is tested for discriminability at regular intervals (e.g., every 10 seconds (s)) during which synaptic plasticity in the network 404 is turned off. Each input pattern 400 is presented during the testing process (element 308) in a fixed sequence for d seconds each and the discriminability index is then computed based on the generated firing rate codes (element 316), as described below. The process of estimating d is also described below.

(3.3) Firing Rate Code for Readout Neurons

In some embodiments, for some phases of operation, the firing rate code 406 for the readout neurons are evaluated only during the testing phase during which each input pattern 400 from the training set is presented to the network 404 for a duration of d seconds for a total duration of d*P seconds for P patterns (element 308). Each input vector component stimulates one neuron in the source layer. The source neurons are modeled as Poisson spike sources, as described above and shown in FIGS. 4A and 4B. For each test pattern p, the firing rates $f_i^p$ of sink neuron i in layer 3 of the network 404 can be computed (element 312) as the total number of spikes emitted during a duration of d seconds (element 402). The maximum firing rate $f_{max}^p$ is then estimated from the firing rates of all sink neurons for that test pattern p. The firing rate vector $S^p$ of length M for pattern p is composed of components $S_i^p$. For each sink layer, neuron i can be computed as:

$$S_i^p = \begin{cases} 2, & \text{if } 0.9 \leq \frac{f_i^p}{f_{max}^p} < 1.0 \\ 1, & \text{if } 0.4 \leq \frac{f_i^p}{f_{max}^p} < 0.9 \\ 0, & \text{if } \frac{f_i^p}{f_{max}^p} < 0.4 \end{cases}$$

The vector $S^p$ is referred to as the firing rate code 406 and, in this embodiment, the ternary firing rate code (i.e., C=3) 406 was experimented with because each sink neuron can have three possible states for a given input pattern p. It is possible to use other coding levels such as binary (C=2) or quaternary (C=4) codes 406.

(3.4) Estimating d for Testing

The firing rate code 406 S and the estimation of discriminability index (element 316) depends upon the duration d of each test pattern presentation. To estimate an appropriate duration d, the Fano factor (described in Literature Reference Nos. 7 and 8) was computed from the spikes generated by the readout neurons by assessing the relationship between variability of the spike counts 402 and duration d.

The Fano factor (FF) is defined as the ratio of sample variance to sample mean of spike counts 402 observed in a time window, and the quality of the estimator strongly depends on the length of the window. The FF measures the noise-to-signal ratio and, therefore, characterizes the neural variability over trials. For example, for a Poisson process, the variance equals the mean spike count for any length of the time window. If the FF has a minimum at some value of d, this can be an optimal value for d since the firing rate code 406 would be robust at that value (see, for example, Literature Reference Nos. 9 and 10).

In the system according to some embodiments of the present disclosure, FF is computed for various durations d as follows. The spikes for each test pattern presented for duration of a selected d are first collected for each of the M readout neurons separately (element 310). This is repeated for T trials (in one embodiment T=100) to collect a set of M*T spike count 402 values. The mean and variance in the spike count 402 is then computed from these values. The ratio of the computed variance to mean gives FF for the selected d and for the selected test pattern. This process is repeated for all remaining P−1 test patterns, and the resulting average FF is used as the FF for a given duration d.

(3.5) Discriminability Index Computation

During the learning process, as input patterns 400 are presented, a firing rate code $S^p$ can be computed at the sink layer for each pattern p presented to the source layer, as described above. The ternary firing rate code 406 changes as the network 404 is presented with more inputs. This implies that the ternary firing rate code 406 cannot be directly used for reliably separating one pattern from another. However, after a few pattern presentations, the ability of the network 404 to discriminate between the patterns becomes stable and reliable.

To verify this, a discriminability index (DI) is computed (element 316) as follows. At regular intervals (e.g., once every 10 s in one embodiment), the network 404 was stopped to probe the state of the network 404. During this process, the synaptic weights are frozen and each pattern is presented J times for a duration of d each. For a given pattern p, the firing rate code $S^p$ was computed for each of the J presentations of p. A prototype firing rate code was selected for a given pattern p as the code that is most repeating among the J codes generated. If there are no repeats, one of the J codes is selected as the prototype at random. This process is repeated for each pattern to identify a prototype firing rate code for each input pattern. Using the prototype firing rate codes, the inter-pattern distance ($D_{inter}$) was computed. $D_{inter}$ is defined as the average pair-wise distance between prototype readout codes computed from all possible unique pairs of prototype readout codes generated by the network for a given test set. To calculate $D_{inter}$, the distance $d_i^{pq}$ between a pair of S firing rate codes for two input patterns p and q and for each sink neuron i was computed according to the following:

$$d_i^{pq} = \begin{cases} 0 & \text{if } S_i^p = S_i^q \\ 1 & \text{if } S_i^p \neq S_i^q \end{cases} \quad (2)$$

The distance $D_{inter,i}$ was then computed by using $d_i^{pq}$ for every pair of input patterns p and q for each sink neuron i across all test patterns P as:

$$D_{inter,i} = \frac{\sum_{k=1}^{P-1} \sum_{j=k+1}^{P} \sum_{i=1}^{M} d_i^{kj}}{P*(P-1)/2}. \quad (3)$$

The maximum value of $D_{inter,i}$ for a readout code can be estimated as follows. Assuming a ternary readout code (or firing rate code) at the sink layer (i.e., C=3) and that P is odd, the maximum pairwise distance between the readout code at each sink layer neuron i is obtained when the readout is equiprobable with "0" for one third of P input patterns, "1" for another third of inputs, and "2" for the remaining third. The theoretical maximum value of the numerator (equation 3) can be computed as P*P/3 and thus $D^{max}_{inter}$ can be computed as 2P/(3*(P−1)). If P is even, $D^{max}_{inter}$ can be similarly computed as 2(P+1)/3*P. Similarly, for a binary code (e.g., C=2) $D^{max}_{inter}$ can be computed to be (P+1)/(2*P) when P is odd and 2P/(3*(P−1)) when P is even. Thus, $D^{max}_{inter,i}$ can be computed for the general case when C is even as follows:

$$D_{inter,i}^{max} = \begin{cases} \dfrac{P(C-1)}{C(P-1)} & \text{if } P \text{ is even} \\ \dfrac{(P+1)(C-1)}{CP} & \text{if } P \text{ is odd} \end{cases} \quad (4)$$

Similarly $D^{max}_{inter,i}$ for the general case when C is odd can be expressed as:

$$D_{inter,i}^{max} = \begin{cases} \dfrac{P(C-1)}{C(P-1)} & \text{if } P \text{ is odd} \\ \dfrac{(P+1)(C-1)}{CP} & \text{if } P \text{ is even} \end{cases} \quad (5)$$

The expression for the inter-pattern distance $D_{inter}$ can be written in terms of $D_{inter,i}$ as:

$$D_{inter} = \Sigma_{i=1}^{M} D_{inter,i}. \quad (6)$$

By substituting $D^{max}_{inter,i}$ from equation 4 or equation 5 (depending upon whether C is even or odd, respectively) into equation 6, the theoretical maximum value of $D_{inter}$ can be computed. For example, if C is even, $D_{inter}$ will be PM(C−1)/(C(P−1)) if P is odd and (P+1)M(C−1)/CP if P is even. Thus, if M=8, C=2 and P=15, the theoretical maximum for $D_{inter}$ will be 4.28. It should also be noted that the theoretical maximum for $D_{inter}$ grows linearly with M. The theoretical maximum for $D_{inter}$ will serve as the upper bound for a given set of parameters during learning. This is because there is noise in the network that prevents an equiprobable distribution of readout codes by the network.

An intra-pattern distance ($D_{intra}$) was also computed by presenting the same pattern J times for d seconds each. $D_{intra}$ is defined as the average pair-wise distance between readout codes (same as equation 3) computed from all possible unique pairs of readout codes generated by the network for the same input pattern. This distance provides a measure of an average variation in the response of readout neurons for the same input pattern. This variation can be caused due to noise in the inputs.

The discriminability index (DI) is then defined as a product of two measures. The first is called separability, $\varepsilon$, which measures the degree of separation of readout codes for a given test set. This measure can be computed as follows:

$$\varepsilon = 1 - \dfrac{D_{intra}}{D_{inter}}. \quad (7)$$

This measure is akin to computing the Fischer metric (see Literature Reference No. 11). A small $D_{intra}$ relative to $D_{inter}$ implies that the network can separate the inputs well. Separability is independent of M.

The second measure is called the uniqueness, $\gamma$, which is defined as the number of unique readout codes produced by the network relative to maximum possible number of unique readout code. Some input patterns produce the same code. Then, the code is counted as one unique code. For instance, if there are ten patterns and seven patterns produce seven different codes, then three patterns produce one same code, there are eight unique codes. This can be expressed as:

$$\gamma = \dfrac{\#S}{P}, \quad (8)$$

where # S represents the total number of unique readout codes (or firing rate codes) for a given test set of size P. Uniqueness is dependent on M since high dimensional readout codes generate more unique codes, as described in Literature Reference No. 12 The discriminability index (DI) is then computed as follows:

$$DI = \varepsilon * \gamma \quad (9)$$

High values of DI correspond to readout codes that are have a low $D_{intra}$ combined with high $D_{inter}$ or high separability as well as a high uniqueness. The maximum value of DI is 1.0 and its minimum value is typically zero unless $D_{intra} > D_{inter}$. DI is dependent on M since uniqueness is dependent on M.

(3.5.1) Examples for DI Computation

Figure 5A:
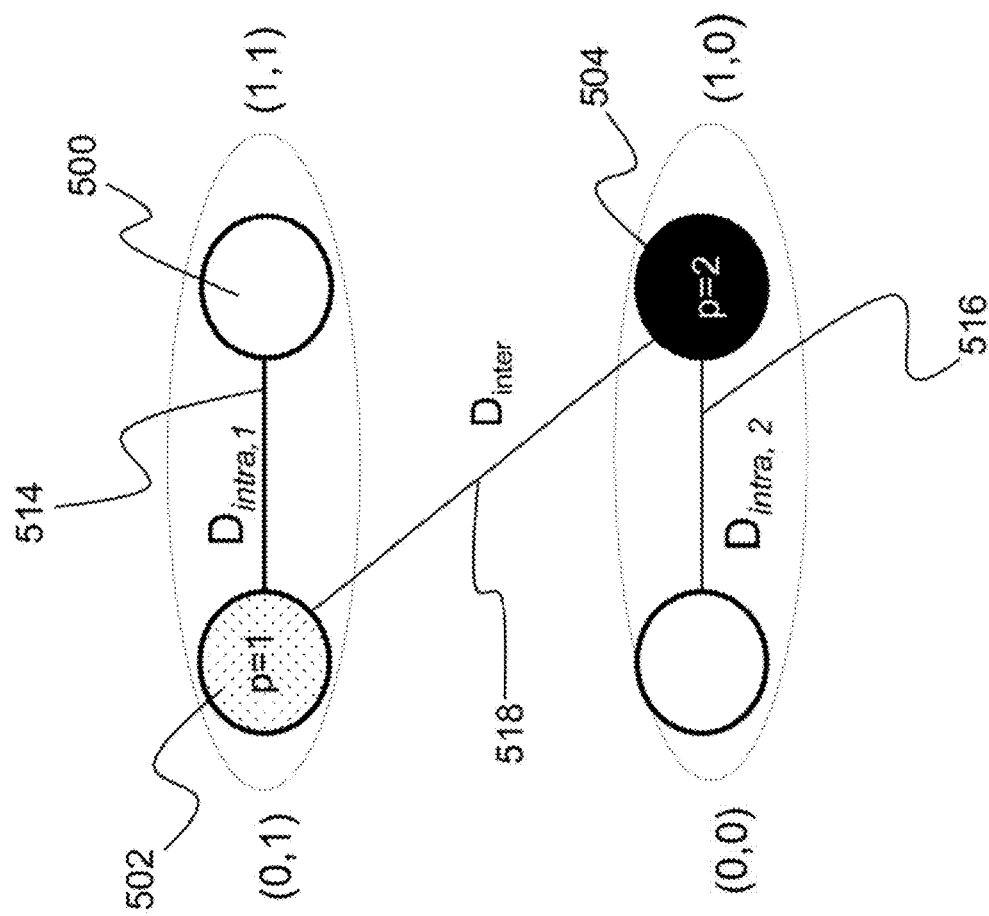
FIG. 5A is an illustration of discriminability index (DI) computation for a first example according to some embodiments of the present disclosure.
Figure 5B:
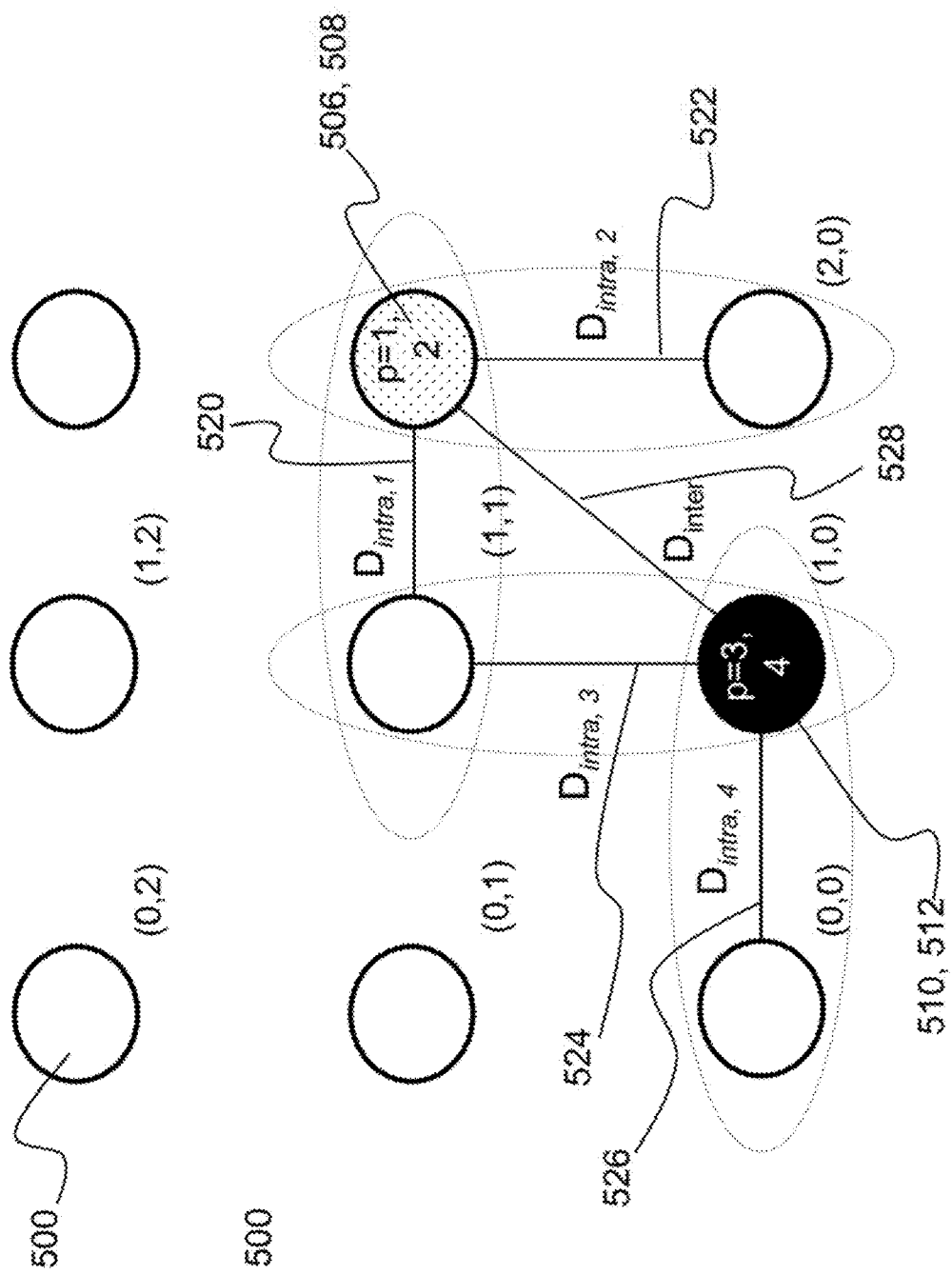
FIG. 5B is an illustration of DI computation for a second example according to some embodiments of the present disclosure.

Assuming the coding level C=3 and assuming that there are two readout units in the sink layer of the network for both examples below allows for visualization of the readout codes in two dimensions (2-D) for simplicity. This analysis, however, readily extends to other coding levels. The details of DI computation for two different examples are shown in FIGS. 5A and 5B. In FIG. 5A, the readout code for the first example uses M=2 and C=2. Each node 500 (represented by a circle in FIGS. 5A and 5B) represents one of four possible states. There are a total of 2 input patterns 502 and 504 (P=2) for the example illustrated in FIG. 5A. In FIG. 5B, the readout code for the second example uses M=2 but C=3. Each node 500 represents one of 9 possible states. There are a total of 4 input patterns 506, 508, 510, and 512 (P=4) for this example.

Example 1: Assume that there are two test input patterns 502 and 504 (P=2) and each of them is presented 10 times, resulting in 10 readout codes for each test pattern as follows: $S^1 = \{(0, 1); (0, 1); (0, 1); (0, 1); (1, 0); (1, 1); (1, 1); (0, 1); (0, 1); (0, 1); (0, 1)\}$ and $S^2 = \{(1, 0); (1, 0); (0, 0); (0, 0); (1, 0); (1, 0); (0, 0); (1, 0); (0, 0); (1, 0)\}$. Since there are two input patterns 502 and 504 and C=2, there are four possible readout codes, in general. However, based on $S^1$ and $S^2$, the two readout codes cluster around (0, 1) for p=1 (element 502) and (1, 0) for p=2 (element 504).

The various values for DI can be computed as follows. Using equation 3 and the readout code $S^1$, $D_{intra, 1} = 6*4/(10*9/2) = 24M/45$ (element 514) and $D_{intra, 2} = 8*2/(10*9/2) = 16M/45$ (element 516); thus the average $D_{intra} = 20M/45$. Since the readout codes cluster around (0, 1) and (1, 0) for the two test patterns, $D_{inter} = 2M$ (element 518). Using these $D_{inter}$ and $D_{intra}$, separability can be computed as $\varepsilon = 1 - 10/45 = 35/45$. Since there are two unique codes for the two test patterns, uniqueness $\gamma = 1$. Thus, the discriminability index for this example will be DI=15/45=0.78.

Example 2: Assume that there are four test patterns 506, 508, 510, and 512 (P=4) and each of them is presented 10 times resulting in 10 readout codes for each test pattern as follows: $S^1 = \{(2, 1); (2, 1); (2, 1); (2, 1); (2, 1); (1, 1); (1, 1); (2, 1); (2, 1); (2, 1); (2, 1)\}$, $S^2 = \{(2, 1); (2, 1); (2, 0); (2, 0); (2, 1); (2, 0); (2, 1); (2, 1); (2, 1); (2, 1)\}$, $S^3 = \{(1, 0); (1, 0); (0, 0); (0, 0); (1, 0); (1, 0); (0, 0); (1, 0); (0, 0); (1, 0)\}$, $S^4 = \{(1, 0); (1, 0); (1, 1); (1, 0); (1, 0); (1, 1); (1, 0); (1, 0); (1, 1); (1, 0)\}$. This scenario can be visualized using four possible readout codes, in general. Based on four readout codes, they cluster around (2, 1) for p=1, 2 (element 506 and 508) and (1, 0) for p=3, 4 (elements 510 and 512).

The various values for DI can be computed as follows. Using equation 3 and the readout code $S^1$, $D_{intra, 1} = 16M/45$ (element 520), $D_{intra, 2} = 21M/45$ (element 522). $D_{intra, 3} = 24M/45$ (element 524), and $D_{intra, 4} = 21M/45$ (element 526). Thus, the average $D_{intra}$ can be computed as 41M/90. Since the readout codes cluster around (0, 1) and (1, 0) for the four test patterns, the $D_{inter}=2*2*M/(4*3/2)=2M/3$ (element 528). Using these $D_{inter}$ and $D_{intra}$, separability can be calculated as $\varepsilon=1-41/60=19/60$. Since there are only two unique codes for the four test patterns, uniqueness $\gamma=\frac{1}{2}$. Thus, DI for this example will be $DI=(19/60)*(\frac{1}{2})=0.16$. This is lower compared to Example 1, since the four patterns are less separable compared to the two test pattern cases and the readout codes are also not unique enough compared to Example 1. These examples illustrate the basics of how the DI is computed and can be readily extended to deal with networks that have larger M and are coded with different coding levels.

(3.6) Experimental Studies

Figure 6A:
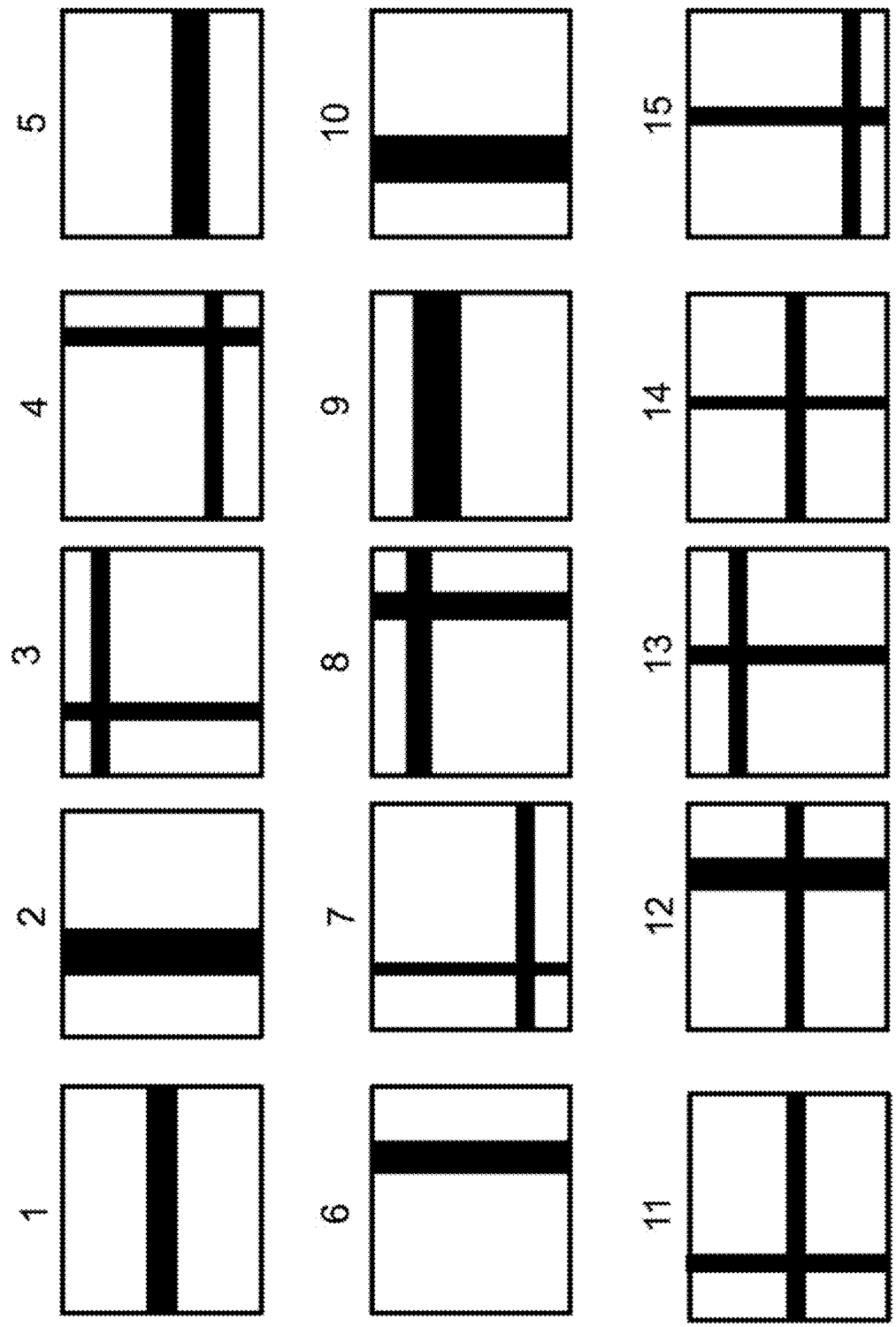
FIG. 6A is an illustration of training patterns used for a network according to some embodiments of the present disclosure.
Figure 6B:
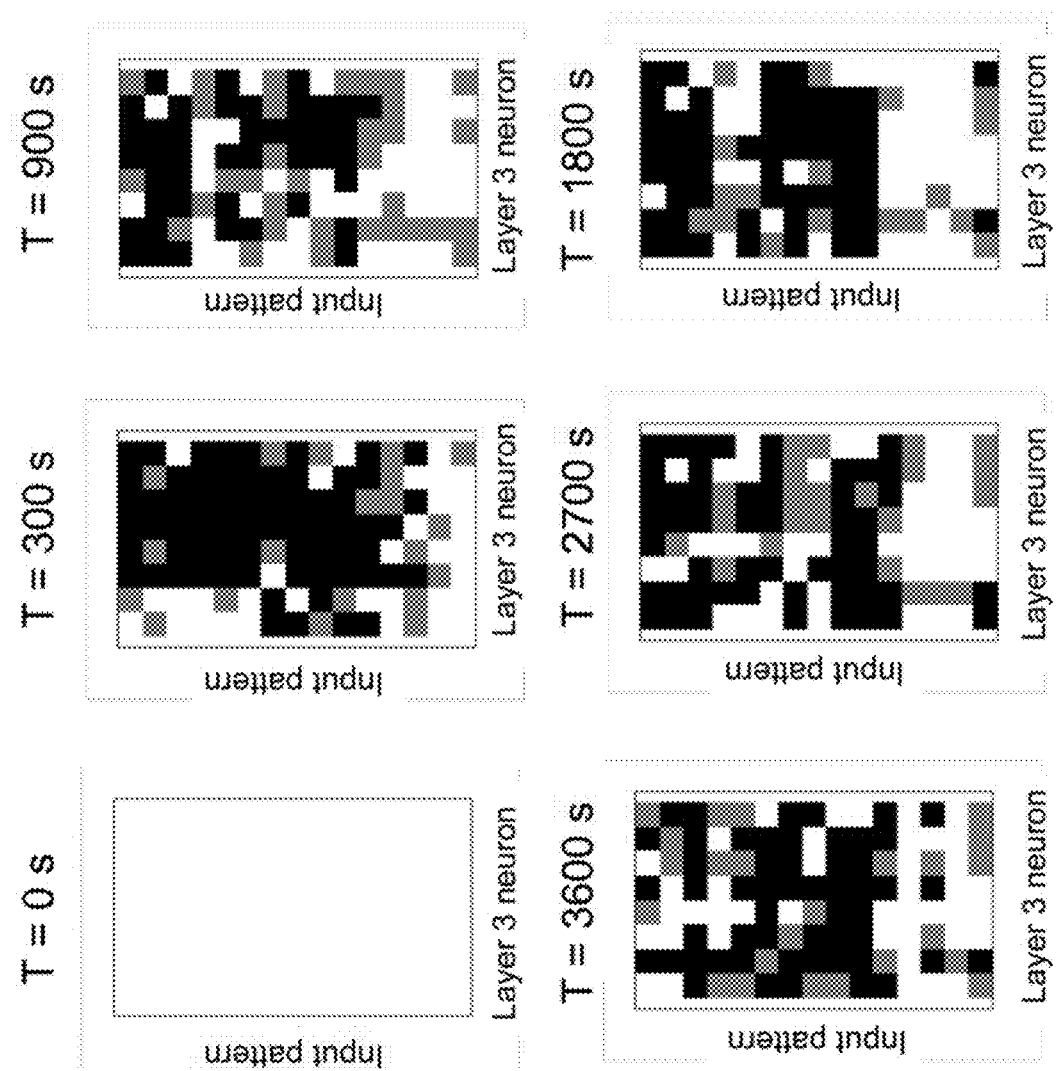
FIG. 6B is an illustration of readout codes from the network during various stages of testing according to some embodiments of the present disclosure.

FIG. 6A depicts training patterns used for the network in experimental studies. The initial training set was constructed with P=15 flag patterns. The patterns were presented in random order for a duration selected from an exponential distribution with a mean of 30 ms. FIG. 6B illustrates readout codes from the network during various stages of testing (i.e., 0 s, 300 s, 900 s, 1800 s, 2700 s, and 3600 s). Each pattern generated a Poisson spike train at the source neurons, as described above. These spikes generated by each pattern in the input layer were transmitted to the E reservoir neurons in the middle layer. As the training patterns were presented, synapses between the source layer neurons and each E neuron of the reservoir in layer 2 collectively formed receptive fields (see Literature Reference No. 6). This was achieved by adjusting the strength of these synapses via STDP (see Literature Reference No. 6 for details).

In order to assess the pattern discrimination capability, the training set was presented to the network for a total of 3600 s. The firing rate of the readout neurons was monitored after every 10 s of training to test the network's ability to discriminate the input patterns. At these time intervals, plasticity was turned off and each input pattern was presented in a random order for 5 s and the DI metric (equation 9) was computed based on the activity of the readout neurons. The ternary code from the readout codes was plotted for each input pattern at regular intervals during the course of training, as shown in FIG. 6B. The readout code initially looked alike for all patterns since the network had not been exposed to all of the patterns. As the network was exposed to more training data, the readout codes begin to show more variations. However, when the readout codes for an input pattern at two different times are compared, they appeared to change constantly throughout the duration of the training period. This implied that a static template based discrimination algorithm would not be appropriate here.

Figure 6C:
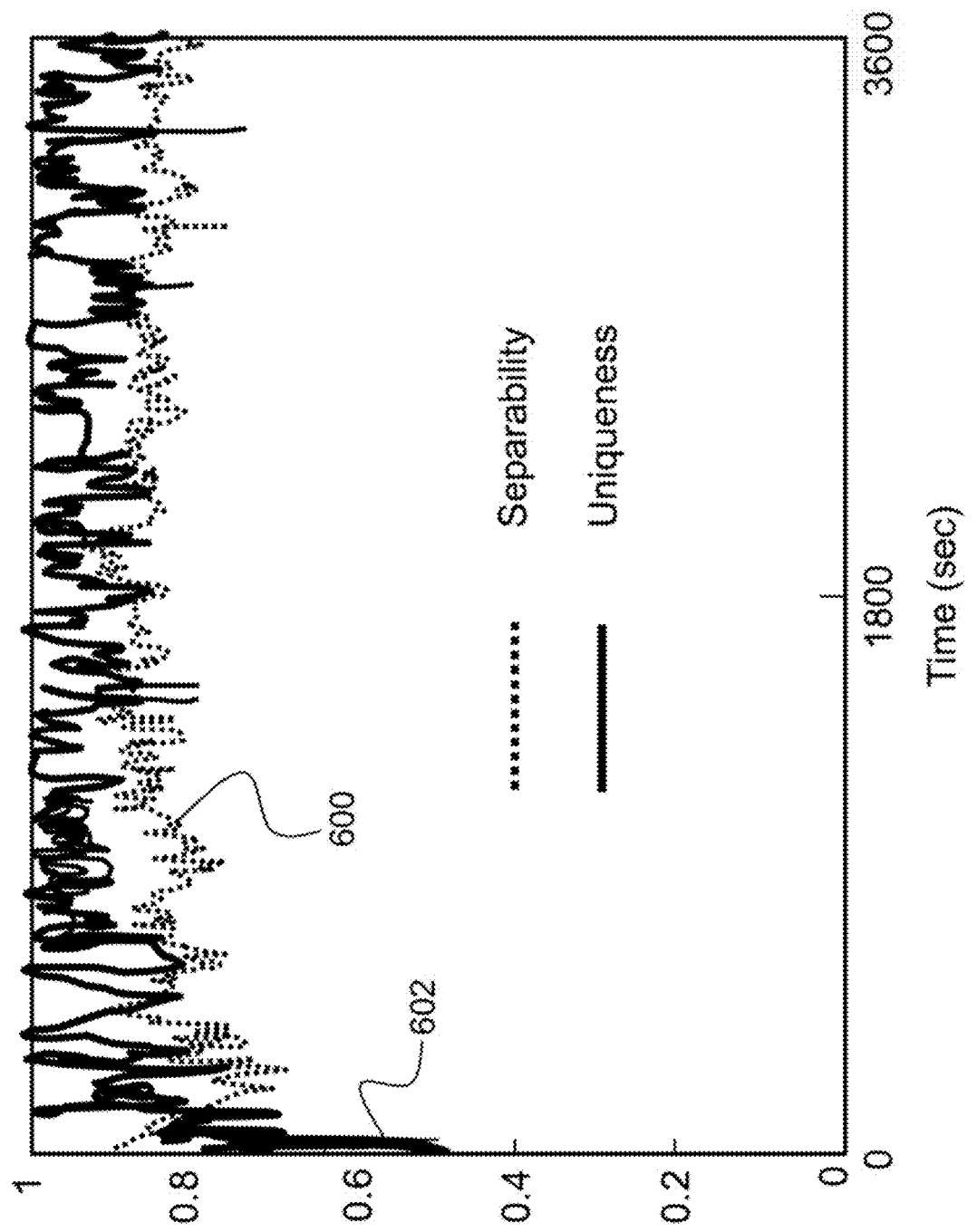
FIG. 6C is an illustration of separability and uniqueness measures according to some embodiments of the present disclosure.

FIG. 6C is a plot depicting that separability and uniqueness measures are high after some initial duration, where the separability measure 600 is represented by a dashed line, and the uniqueness measure 602 is represented by a solid line. The separability and uniqueness were tracked during the first hour of training. The network exhibited good separability (equation 7) and uniqueness (equation 8).

Figure 6D:
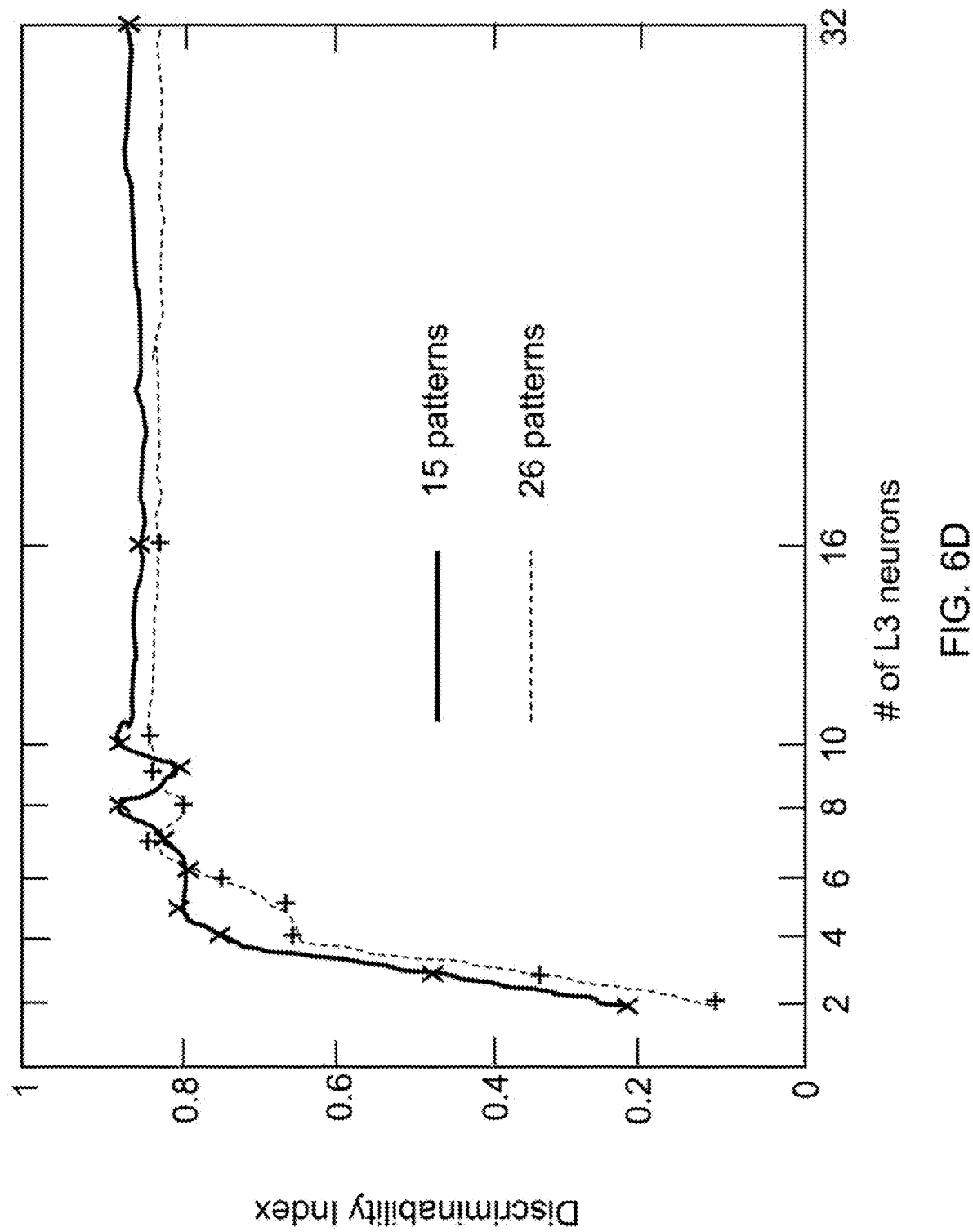
FIG. 6D is an illustration of the DI for the test patterns according to some embodiments of the present disclosure.

FIG. 6D is a plot illustrating that the discriminability index is high for the test patterns. The DI (equation 9), thus, rapidly rises to ~0.8, implying very good discriminability.

The invention described herein enables a more scalable method to decode spiking activity in neuromorphic chips and, thus, enables complex supervised and unsupervised learning applications with continuous inputs and outputs. This approach can be integrated into a neuromorphic chip such that it is possible to decode chip outputs robustly for numerous automotive and aerospace products, including cars, planes, and unmanned aerial vehicles (UAVs) that require size, weight, area and power (SWAP) constraints to be satisfied. For example, when integrated into a decode chip or used as part of a decode process, some embodiments of the system may acquire readout codes from a neural network that has been presented with an input signal (e.g., an input image, sound, or radar signal to be analyzed). The readout codes may then be matched with validated readout codes that correspond to known results to identify aspects of the input signal. In this way, for some embodiments, the neural networks trained using parts of the above methods and/or validated using the DI can be applied in various applications and systems (e.g., image recognition, sound recognition, radar object recognition).

The system according to embodiments of the present disclosure provides a decoder that is more applicable for spiking neural networks than those used in state-of-the-art machine learning algorithms, such as convolutional neural networks (see Literature Reference Nos. 1 and 2), liquid state machines (see Literature Reference No. 3), and echo state machines ('see Literature Reference No. 4), which are only applicable for firing rate models. Unlike these prior models, the decoder approach described herein enables unsupervised learning, thus increasing the scope of applications that spiking networks can be used for including neuromorphic chips for autonomous applications with SWAP constraints, as described above. Neuromorphic chips are fast pattern-matching engines that process the data in a memory.

The system and method described herein recognizes input patterns from input images with on-line learning. This technology has many applicable areas depending on the training input patterns. If the input patterns are vehicles, pedestrians, motorcyclists, or bicyclists, for example, this could be applicable to autonomous driving to recognize objects around the vehicle with image sensing devices, such as cameras, LADAR, and LIDAR. Additionally, if the input patterns are airplanes and/or objects in airports, the invention could be applicable to aircrafts. This technology is especially favorable to applications with limited power sources such as UAVs, because the neuromorphic chip uses very little power.

What is claimed is:

1. A system for decoding output from spiking reservoirs, the system comprising:
   one or more processors and a non-transitory memory having instructions encoded thereon such that when the instructions are executed, the one or more processors perform operations of:
   training a neural network having a spiking reservoir comprised of spiking neurons by using a set of training patterns, wherein synaptic connections between the spiking neurons obey spike-timing dependent plasticity (STDP);
   determining a test pattern duration d for each test pattern in a set of test patterns, wherein the test pattern duration d is determined using a computed Fano factor;
   presenting each test pattern in the set of test patterns to the spiking reservoir for the test pattern duration d, the spiking reservoir having continuous synaptic plasticity;
   generating output spikes from the spiking reservoir via a set of readout neurons;
   converting the output spikes into a plurality of firing rate codes, each firing rate code corresponding to a test pattern in the set of test patterns P;
   decoding a discriminability performance of the neural network using a discriminability index (DI), wherein the DI provides a measure of how discriminable the plurality of test patterns are from one another;

wherein the DI is a product of a separability measure, E, and a uniqueness measure, γ, wherein the separability measure is defined as a measure of a degree of separation of firing rate codes for the set of test patterns P, and wherein the uniqueness measure is defined as a number of unique firing rate codes produced by the neural network relative to a maximum possible number of unique firing rate codes; and performing unsupervised autonomous discrimination between test patterns in the set of test patterns P based on the firing rate codes.

2. The system as set forth in claim 1, wherein the one or more processors further perform operations of:

computing, for each test pattern p, firing rates $f_i^p$ of a sink neuron i in the neural network as the total number of output spikes during the test pattern duration d for each test pattern p;

estimating a maximum firing rate $f_{max}^p$ from the firing rates $f_i^p$ of all sink neurons in the neural network for the test pattern p; and computing a firing rate code for each test pattern p using $f_{max}^p$ and $f_i^p$.

3. The system as set forth in claim 1, wherein the separability measure is computed according to the following:

$$\varepsilon = 1 - \frac{D_{intra}}{D_{inter}},$$

where $D_{intra}$ is defined as an average pair-wise distance between firing rate codes computed from all possible unique pairs of firing rate codes generated by the neural network for the same test pattern, and $D_{inter}$ is defined as an average pair-wise distance between firing rate codes computed from all possible unique pairs of firing rate codes generated by the neural network for the set of test patterns P.

4. The system as set forth in claim 3, wherein the uniqueness measure is computed according to the following:

$$\gamma = \frac{\#S}{P},$$

where # S represents the total number of unique firing rate codes for the set of test patterns P.

5. A computer-implemented method for decoding output from spiking reservoirs, comprising:

an act of causing one or more processors to execute instructions stored on a non-transitory memory such that upon execution, the one or more processors perform operations of:

training a neural network having a spiking reservoir comprised of spiking neurons by using a set of training patterns, wherein synaptic connections between the spiking neurons obey spike-timing dependent plasticity (STDP);

determining a test pattern duration d for each test pattern in a set of test patterns, wherein the test pattern duration d is determined using a computed Fano factor;

presenting each test pattern in the set of test patterns to the spiking reservoir for the test pattern duration d, the spiking reservoir having continuous synaptic plasticity;

generating output spikes from the spiking reservoir via a set of readout neurons;

converting the output spikes into a plurality of firing rate codes, each firing rate code corresponding to a test pattern in the set of test patterns P;

decoding a discriminability performance of the neural network using a discriminability index (DI), wherein the DI provides a measure of how discriminable the plurality of test patterns are from one another;

wherein the DI is a product of a separability measure, E, and a uniqueness measure, γ, wherein the separability measure is defined as a measure of a degree of separation of firing rate codes for the set of test patterns P, and wherein the uniqueness measure is defined as a number of unique firing rate codes produced by the neural network relative to a maximum possible number of unique firing rate codes; and performing unsupervised autonomous discrimination between test patterns in the set of test patterns P based on the firing rate codes.

6. The method as set forth in claim 5, wherein the one or more processors further perform operations of:

computing, for each test pattern p, firing rates $f_i^p$ of a sink neuron i in the neural network as the total number of output spikes during the test pattern duration d for each test pattern p;

estimating a maximum firing rate $f_{max}^p$ from the firing rates $f_i^p$ of all sink neurons in the neural network for the test pattern p; and computing a firing rate code for each test pattern p using $f_{max}^p$ and $f_i^p$.

7. The method as set forth in claim 5, wherein the separability measure is computed according to the following:

$$\varepsilon = 1 - \frac{D_{intra}}{D_{inter}},$$

where $D_{intra}$ is defined as an average pair-wise distance between firing rate codes computed from all possible unique pairs of firing rate codes generated by the neural network for the same test pattern, and $D_{inter}$ is defined as an average pair-wise distance between firing rate codes computed from all possible unique pairs of firing rate codes generated by the neural network for the set of test patterns P.

8. The method as set forth in claim 7, wherein the uniqueness measure is computed according to the following:

$$\gamma = \frac{\#S}{P},$$

where # S represents the total number of unique firing rate codes for the set of test patterns P.

9. A computer program product for decoding output from spiking reservoirs, the computer program product comprising:

computer-readable instructions stored on a non-transitory computer-readable medium that are executable by a computer having one or more processors for causing the processor to perform operations of:

training a neural network having a spiking reservoir comprised of spiking neurons by using a set of training patterns, wherein synaptic connections between the spiking neurons obey spike-timing dependent plasticity (STDP);

determining a test pattern duration d for each test pattern in a set of test patterns, wherein the test pattern duration d is determined using a computed Fano factor;

presenting each test pattern in the set of test patterns to the spiking reservoir for the test pattern duration d, the spiking reservoir having continuous synaptic plasticity;

generating output spikes from the spiking reservoir via a set of readout neurons;

converting the output spikes into a plurality of firing rate codes, each firing rate code corresponding to a test pattern in the set of test patterns P;

decoding a discriminability performance of the neural network using a discriminability index (DI), wherein the DI provides a measure of how discriminable the plurality of test patterns are from one another;

wherein the DI is a product of a separability measure, E, and a uniqueness measure, γ, wherein the separability measure is defined as a measure of a degree of separation of firing rate codes for the set of test patterns P, and wherein the uniqueness measure is defined as a number of unique firing rate codes produced by the neural network relative to a maximum possible number of unique firing rate codes; and performing unsupervised autonomous discrimination between test patterns in the set of test patterns P based on the firing rate codes.

10. The computer program product as set forth in claim 9, further comprising instructions for causing the one or more processors to perform operations of:

computing, for each test pattern p, firing rates $f_i^p$ of a sink neuron i in the neural network as the total number of output spikes during the test pattern duration d for each test pattern p;

estimating a maximum firing rate $f_{max}^p$ from the firing rates $f_i^p$ of all sink neurons in the neural network for the test pattern p; and computing a firing rate code for each test pattern p using $f_{max}^p$ and $f_i^p$.

11. The computer program product as set forth in claim 9, wherein the separability measure is computed according to the following:

$$\varepsilon = 1 - \frac{D_{intra}}{D_{inter}},$$

where $D_{intra}$ is defined as an average pair-wise distance between firing rate codes computed from all possible unique pairs of firing rate codes generated by the neural network for the same test pattern, and $D_{inter}$ is defined as an average pair-wise distance between firing rate codes computed from all possible unique pairs of firing rate codes generated by the neural network for the set of test patterns P.

12. The computer program product as set forth in claim 11, wherein the uniqueness measure is computed according to the following:

$$\gamma = \frac{\#S}{P},$$

where # S represents the total number of unique firing rate codes for the set of test patterns P.

13. The system as set forth in claim 1, wherein the set of test patterns P are input patterns from images obtained around a vehicle, and wherein the set of test patterns P are used to assist the vehicle in autonomous driving.

14. The system as set forth in claim 1, wherein the one or more processors perform operations of:

providing an input signal to the neural network;

obtaining a readout code from the neural network produced in response to the input signal; and identifying a component of the input signal based on the readout code.

* * * * *